United States Patent
Friedrichs

(10) Patent No.: US 8,740,517 B2
(45) Date of Patent: Jun. 3, 2014

(54) ONLY PARTLY GROUND TOOL ROD MADE OF SINTERED MATERIAL

(76) Inventor: Arno Friedrichs, Kulmbach (DE)

( * ) Notice: Subject to any disclaimer, the term of this patent is extended or adjusted under 35 U.S.C. 154(b) by 1115 days.

(21) Appl. No.: 12/733,683

(22) PCT Filed: Sep. 15, 2008

(86) PCT No.: PCT/EP2008/062236
§ 371 (c)(1),
(2), (4) Date: Mar. 15, 2010

(87) PCT Pub. No.: WO2009/037223
PCT Pub. Date: Mar. 26, 2009

(65) Prior Publication Data
US 2010/0232898 A1    Sep. 16, 2010

(30) Foreign Application Priority Data
Sep. 17, 2007  (DE) .......................... 10 2007 044 269

(51) Int. Cl.
*B23B 51/02*    (2006.01)

(52) U.S. Cl.
USPC ............. 408/230; 76/108.6; 76/115; 408/144

(58) Field of Classification Search
USPC ......... 408/144, 227, 230; 76/102, 108.6, 115, 76/108.1; 451/48
See application file for complete search history.

(56) References Cited

U.S. PATENT DOCUMENTS

| | | | |
|---|---|---|---|
| 3,824,026 A * | 7/1974 | Gaskins ........................ | 408/210 |
| 4,642,003 A * | 2/1987 | Yoshimura .................... | 408/144 |
| 4,813,823 A | 3/1989 | Bieneck | |
| 4,881,431 A * | 11/1989 | Bieneck ........................ | 76/108.6 |
| 4,983,079 A * | 1/1991 | Imanaga et al. .............. | 408/230 |
| 5,380,133 A * | 1/1995 | Schimmer ..................... | 408/199 |
| 5,695,304 A * | 12/1997 | Ebert ............................ | 408/227 |
| 5,701,578 A * | 12/1997 | Liu ............................... | 428/565 |
| 5,716,170 A * | 2/1998 | Kammermeier et al. ..... | 408/145 |
| 6,206,062 B1 * | 3/2001 | Motzer ......................... | 144/240 |
| 7,226,254 B2 * | 6/2007 | Friedrichs .................... | 408/226 |
| 2003/0002941 A1 * | 1/2003 | Borschert et al. ............. | 408/230 |
| 2003/0138305 A1 * | 7/2003 | Pedersen ...................... | 408/230 |
| 2006/0056929 A1 * | 3/2006 | Haenle ......................... | 408/199 |
| 2007/0081868 A1 * | 4/2007 | Osawa et al. ................. | 407/54 |
| 2008/0019787 A1 * | 1/2008 | Sampath et al. .............. | 408/230 |
| 2008/0166196 A1 * | 7/2008 | Zhu ............................... | 408/230 |

FOREIGN PATENT DOCUMENTS

| | | |
|---|---|---|
| DE | 36 01 385 | 7/1987 |
| DE | 36 36 798 | 4/1988 |
| DE | 93 13 618 | 11/1993 |

(Continued)

OTHER PUBLICATIONS

International Search Report dated Jan. 26, 2009.

*Primary Examiner* — Daniel Howell
(74) *Attorney, Agent, or Firm* — Jacobson Holman PLLC

(57) ABSTRACT

A tool bit (1) ready for use consists of a sintered material. It has a longitudinal axis (3). At least one swarf chamber (4) spaced from the longitudinal axis (3) land extending along the longitudinal axis (3) is formed in the tool bit (1). The tool bit (1) has at least one cutting edge (8, 10), which is formed in the tool bit (1) by grinding the already sintered tool bit (1), adjoining the swarf chamber (4). According to the invention the swarf chamber (4) is ground only partly and is otherwise unground.

9 Claims, 6 Drawing Sheets

(56) References Cited

FOREIGN PATENT DOCUMENTS

Figure 1:
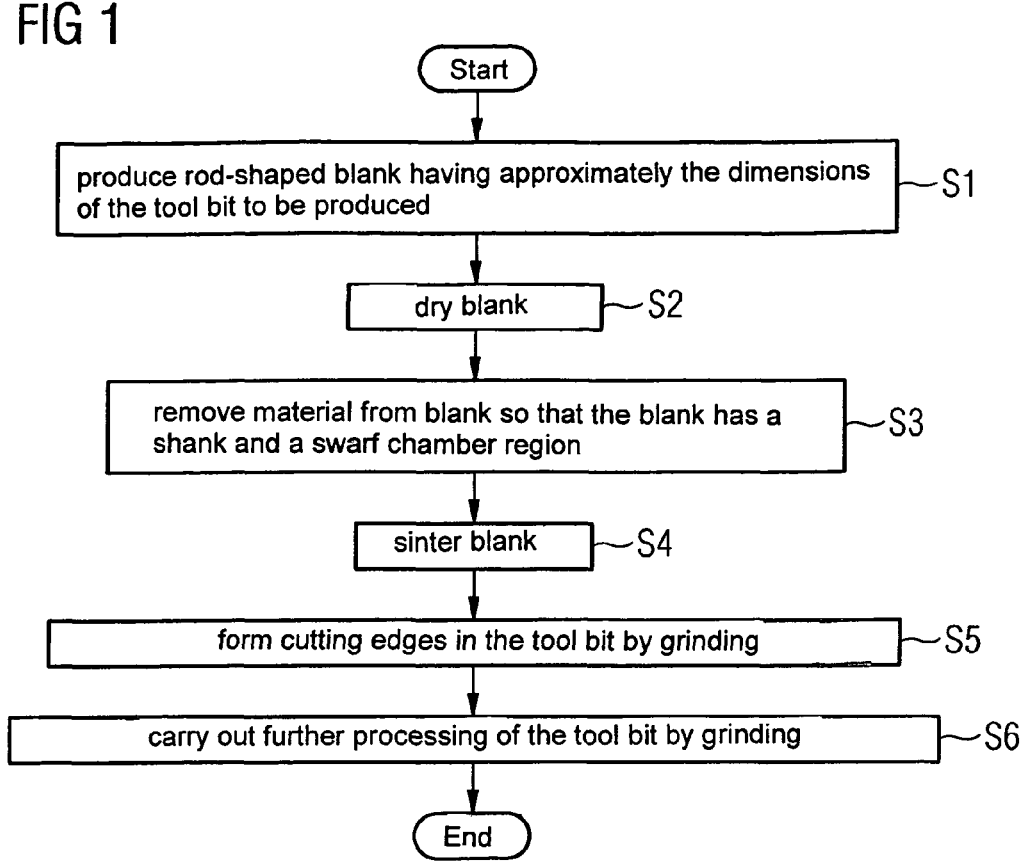

| | | |
|---|---|---|
| DE | 101 42 265 | 3/2003 |
| EP | 0 950 125 | 10/2001 |
| JP | 60-39408 | 3/1985 |
| JP | 4-42311 | 4/1992 |
| JP | 2004299017 A * 10/2004 | ............ B23B 51/00 |
| JP | 2005022064 A * 1/2005 | ............ B23B 51/00 |

* cited by examiner

ONLY PARTLY GROUND TOOL ROD MADE OF SINTERED MATERIAL

This is a national stage of PCT/EP08/062236 filed Sep. 15, 2008 and published in German, which has a priority of German no. 10 2007 044 269.8 filed Sep. 17, 2007, hereby incorporated by reference.

The present invention relates to a method of producing a ready-for-use tool bit consisting of sintered material. The present invention further relates to a tool bit of that kind as well as to a use for a tool bit of that kind.

Tool bits of sintered material are generally known. They are as a rule produced as follows:
- a blank having a longitudinal axis is produced from the material to be sintered;
- at least one swarf chamber spaced from the longitudinal axis and extending along the longitudinal axis is formed in the blank;
- the tool bit is produced by sintering the blank; and
- at least one cutting edge adjoining the swarf chamber is formed in the tool bit by grinding and the tool bit is further processed by grinding.

A production method of that kind and the tool bit corresponding therewith are known from, for example, DE 101 42 265 A1 and the corresponding U.S. Pat. No. 7,226,254 B2.

In the known production method channels are to be formed in the tool bit, which channels run helically around the longitudinal axis of the tool bit in the swarf chamber region. The channels can be used, for example, for feeding a lubricant and/or coolant to the drill tip of a drill. A construction of that kind is also possible within the scope of the present invention. It is not, however, necessary.

The blank shrinks during the sintering process, the exact amount of shrinkage being difficult to predict. For this reason the blank is dimensioned in such a manner that the sintered tool bit is oversize. The oversize is reduced by the grinding process.

After sintering, the tool bit is very hard and can be processed only with difficulty. Processing is therefore expensive.

A tool bit is known from DE 36 36 798 C2 in which the swarf chambers are not processed at all.

A sintered tool bit is known from EP 0 950 125 B1, in which material is ground away from selected regions after a preliminary sintering process. The selected regions comprise, inter alia, the swarf grooves of the tool bit.

The object of the present invention consists in creating a production method for a tool bit, which consists of sintered material, and the tool bit corresponding therewith, in which the cost of production of the tool bit is reduced. In addition, a suitable use for this tool bit shall be indicated.

The object is fulfilled by a production method with the features of claim 1, a tool bit with the features of claim 7 and a use according to claim 14. Advantageous embodiments of the production method are the subject of dependent claims 2 to 6. Advantageous embodiments of the tool bit are the subject of dependent claims 8 to 13.

According to the invention the swarf chamber of the tool bit is ground only in part and otherwise remains unground. Through this measure, the production cost for producing the tool bit can be reduced without the use characteristics thereof being negatively influenced.

It is possible that the swarf chamber is ground over an appreciable part region and remains unground only in the rest. Preferably, however, the swarf chamber is ground exclusively in a region which adjoins at least one of the cutting edges.

For example, at least one of the cutting edges can extend at the end face of the tool bit. In this case the swarf chamber 4, insofar as it adjoins this cutting edge, is ground preferably over a length, as seen in the direction of the longitudinal axis, which lies between half and twice the diameter of the tool bit. The length can lie, in particular, between 0.8 times and 1.2 times the diameter of the tool bit. In this embodiment the tool bit can be constructed as, in particular, a drill. The cutting edge at the end face is in this case arranged at the drill tip.

Alternatively or additionally it is possible that at least one of the cutting edges extends along the longitudinal axis of the tool bit. In this case the swarf chamber, insofar as it adjoins this cutting edge, is preferably ground only in a region directly adjoining this cutting edge.

The cutting edge extending along the longitudinal axis is bounded by two boundary surfaces. One of the boundary surfaces at the same time bounds the swarf chamber and the other one of the boundary surfaces does not bound the swarf chamber. As a rule, the other boundary surface is ground. In many embodiments it is, however, possible that (also) the other boundary surface is unground at least in part.

As sintered material use is usually made of a metal, particularly a hard metal. Alternatively, use of a metal-ceramic mixture is possible. Materials of that kind are known under the term 'Cermet'.

As already mentioned, the tool bit in which the swarf chamber is only partly ground and otherwise unground is fully ready for use. The typical use of this tool bit consists in undertaking machining of a workpiece therewith.

Figure 2:
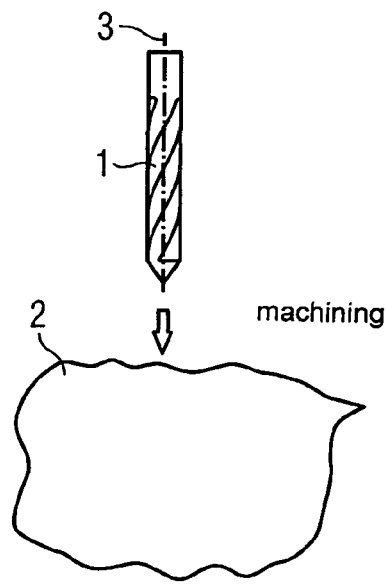
Figure 6:
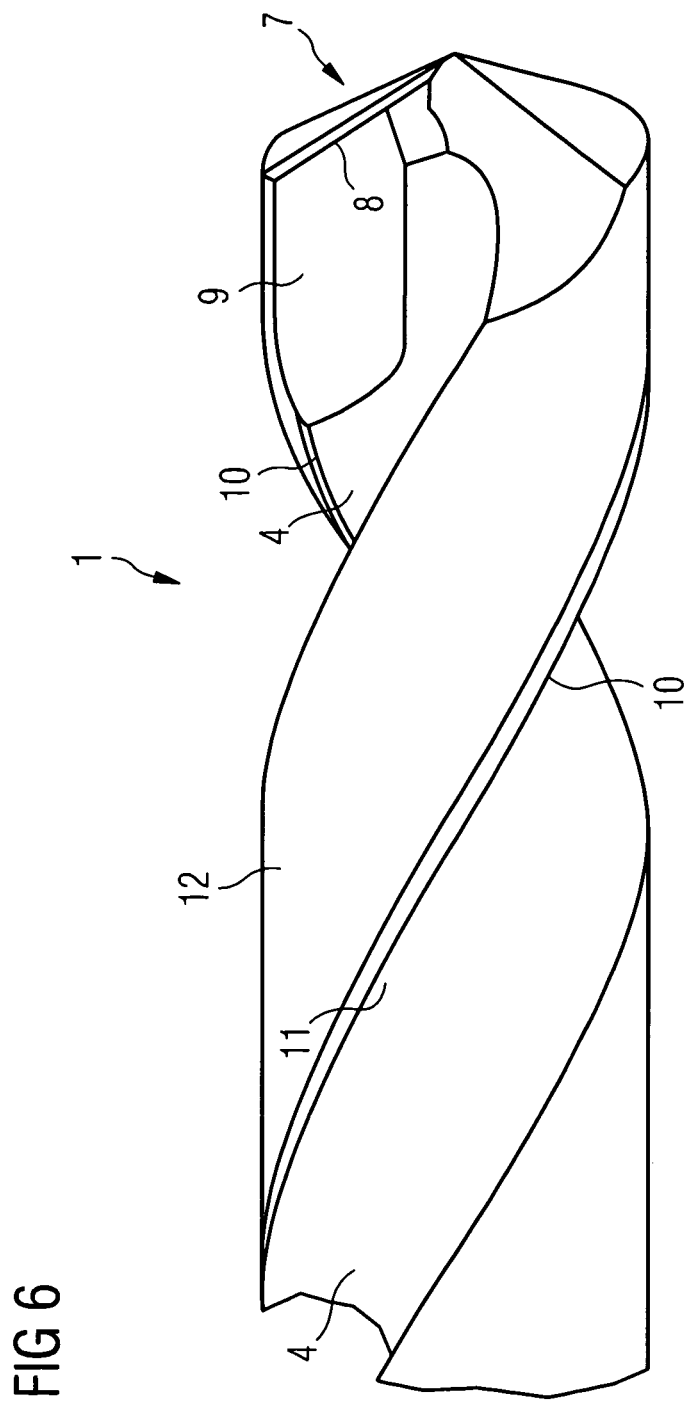
Figure 7:
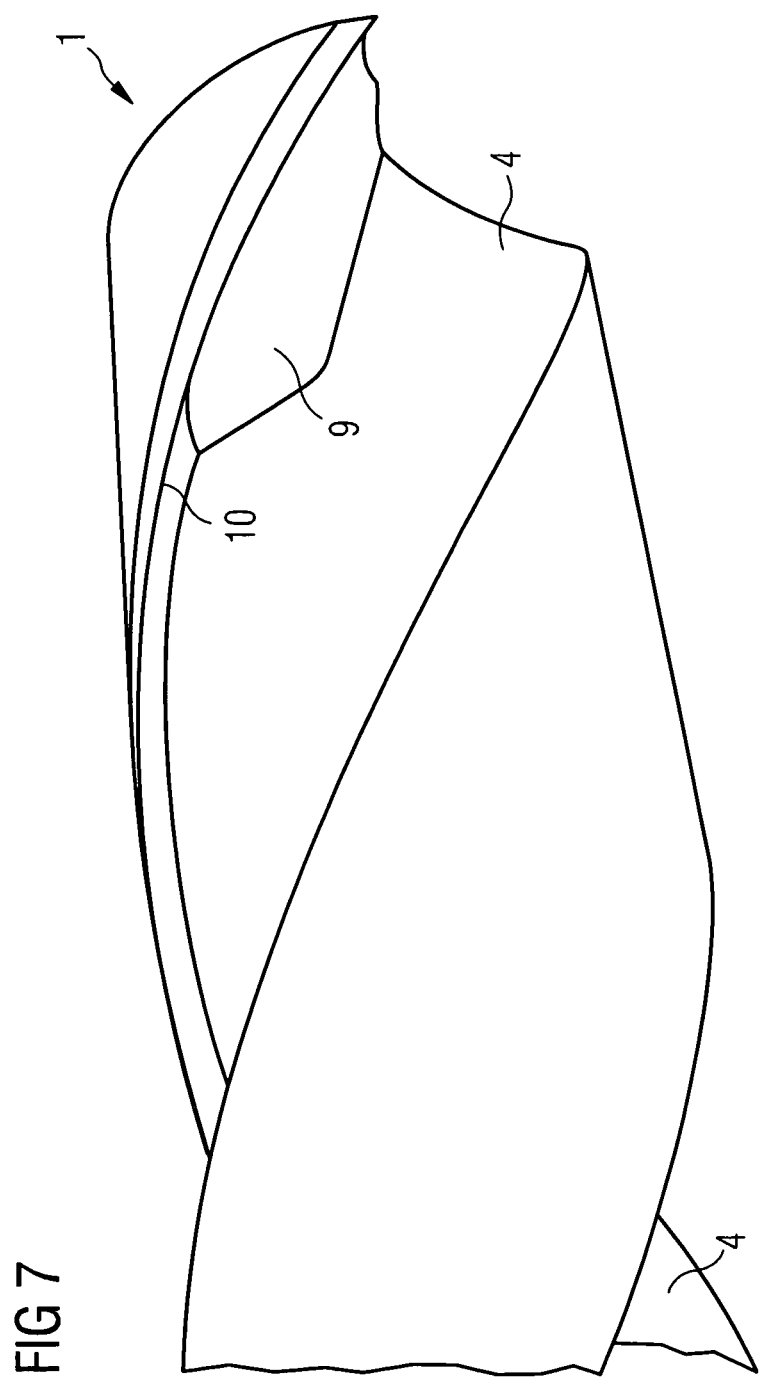
Figure 8:
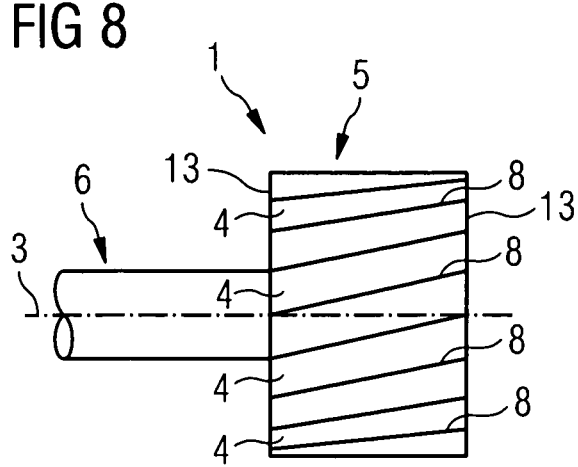
Figure 9:
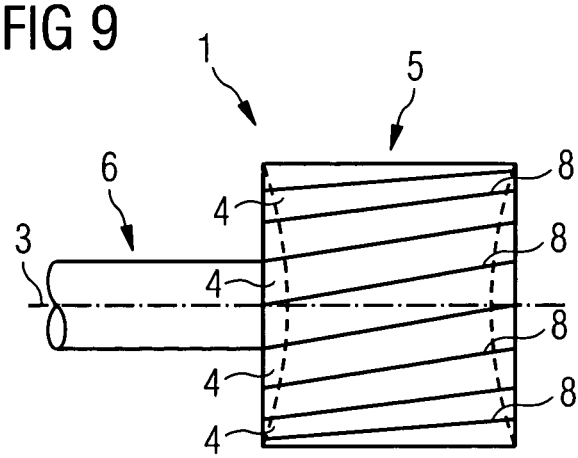
Figure 10:
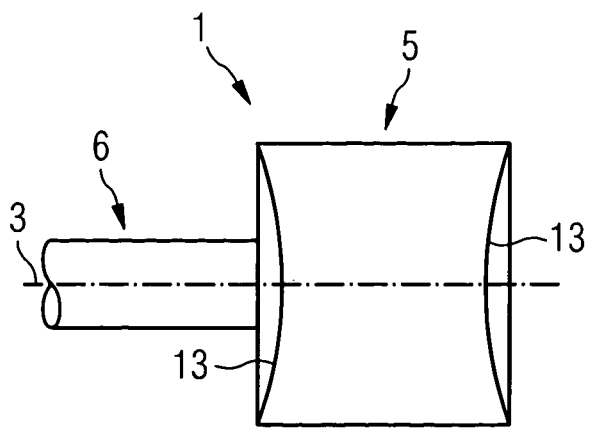

Further advantages and details are evident from the following description of exemplifying embodiments in conjunction with the drawings, in which in diagrammatic illustration:

FIG. 1 schematically shows a production method for producing a tool bit according to the invention, FIG. 2 schematically shows a machining process, FIGS. 3 to 7 show different views of a tool bit constructed as a drill and FIGS. 8 to 10 show two different embodiments of a tool bit constructed as a milling head.

For producing a tool bit according to the invention, according to FIG. 1 initially in a step S1 there is produced a rod-shaped blank having approximately the length and the diameter of the tool bit to be produced. The blank is in this connection produced—for example by extruding—from a pasty mass consisting of a material which is still to be sintered and which is mixed with a binder. The material to be sintered can, for example, be a metal powder, particularly a hard metal powder. Alternatively, the material to be sintered can be a mixture of a metal powder and a ceramic powder.

After production of the blank the blank is dried in a step S2. In this connection, the binder volatilises or evaporates. The dried blank is brittle, but still relatively easy to process. Material is removed from the blank in a step S3 so that it has a shank and a swarf chamber region. The shank is characterised by the fact that, as seen transversely to the longitudinal axis, it has a convex (usually round) cross-section. The swarf chamber region is characterised by the fact that it has at least one swarf chamber. Due to the presence of the swarf chamber the swarf chamber region has, seen transversely to the longitudinal axis, a cross-section which in places is convex and in places concave.

The blank produced in the step S3 is sintered in a step S4 and a tool bit thus produced. The blank shrinks during sintering. The exact amount by which the blank shrinks during sintering is subject to fluctuations.

Due to the fluctuations of the shrinkage process the blank has to be dimensioned in such a manner that after sintering it has an excess size. Thus, reprocessing of the tool bit is required after the sintering. This reprocessing is carried out in steps S5 and S6. The sequence of steps S5 and S6 is as desired.

According to FIG. 1, cutting edges are formed in the tool bit in step S5. The number of formed cutting edges is selectable according to need. At least one cutting edge is formed for each swarf chamber. Each cutting edge adjoins a swarf chamber. The forming of the cutting edges in the tool bit is carried out by grinding.

The tool bit is further processed by grinding in the step S6. In particular, an oversize of the tool bit is removed. However, the swarf chamber is only partly ground. It otherwise remains unground. This procedure stands in contrast to the prior art, in which as a rule the entire swarf chamber is ground.

After the end of the step S6 the thus-produced tool bit is ready for use. In particular, a machining of a workpiece can be carried out by means of the thus-produced tool bit according to FIG. 2. The tool bit is provided in FIG. 2 with the reference numeral 1 and the workpiece with the reference numeral 2. The workpiece consists of, for example, a wood material or of metal.

Figure 3:
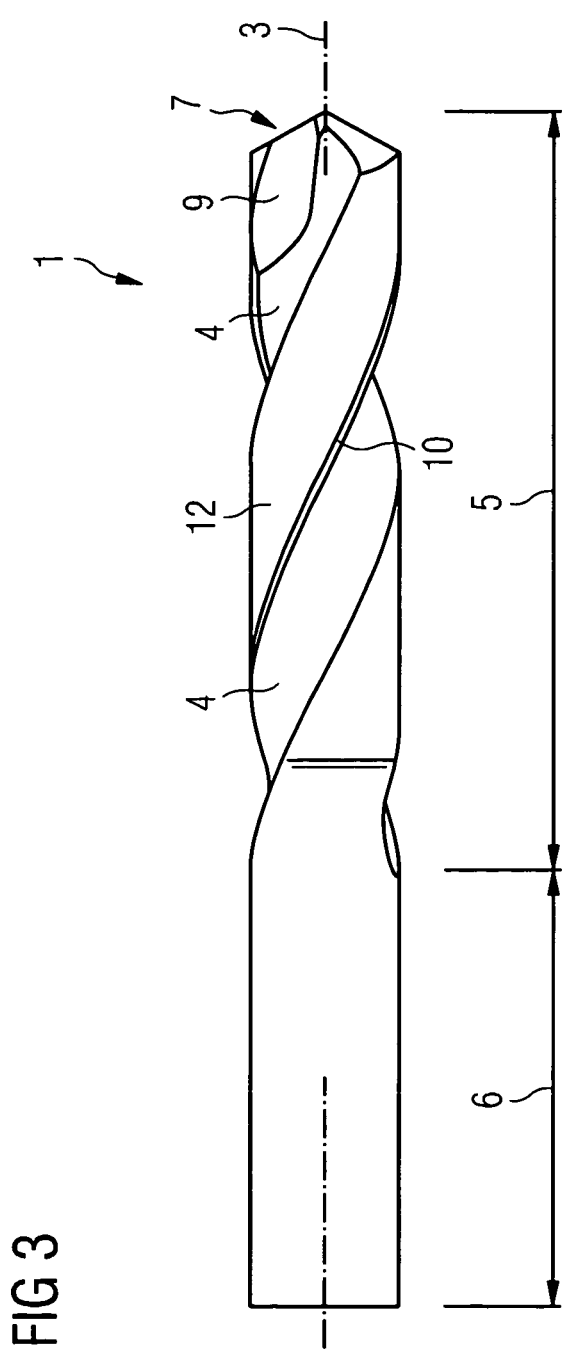

The construction of the tool bit 1 in accordance with the invention is explained again in the following in conjunction with FIGS. 3 to 7 for a tool bit 1 constructed as a drill. FIG. 3 shows an overall cross-section of the tool bit 1, FIG. 4 a cross-section through the tool bit 1 in the swarf chamber region, FIG. 5 a form of the drill tip of the tool bit 1, FIG. 6 an enlarged illustration of the swarf chamber region of the tool bit of FIG. 3 and FIG. 7 a detail of FIG. 6.

According to FIGS. 3 to 7 the tool bit 1, has a longitudinal axis 3. At least one swarf chamber 4 extends at a spacing from the longitudinal axis 3. According to FIGS. 3 to 7 two swarf chambers 4 are present, which are diametrically opposite one another with respect to the longitudinal axis 3. However, neither the number of swarf chambers 4 nor the arrangement thereof with respect to the longitudinal axis 3 is mandatory. It is only critical that at least one swarf chamber 4 is present. Moreover, the swarf chambers 4 are usually of identical construction. However, this is not absolutely necessary.

By reason of the construction of the tool bit 1 of FIGS. 3 to 7 as a drill the swarf chambers 4 run helically around the longitudinal axis 3. However, this is not obligatory. The swarf chambers 4 could alternatively have only a slight twist or run completely parallel to the longitudinal axis 3. It is merely critical that they are spaced from the longitudinal axis 3 and extend along the longitudinal axis 3.

As apparent, the swarf chambers 4 do not extend over the entire length of the tool bit 1. The region over which the swarf chambers 4 extend, as seen in the direction of the longitudinal axis 3, forms a swarf chamber region 5 and the remaining region of the tool bit forms a shank 6.

By virtue of the construction of the tool bit 1 of FIGS. 3 to 7 as a drill the tool bit 1 has a drill tip 7. The drill tip 7 is usually of conical form.

Principal cutting edges 8 (principal cutters 8) are formed in the tool bit 1 at the drill tip 7. The principal cutting edges 8 adjoin the ends of the swarf chambers 4. The forming of the principal cutting edges 8 in the tool bit 1 is in this connection carried out in the same manner as also in the prior art. By contrast to the prior art the swarf chambers 4 at the drill tip 7 are ground only to the extent that this is required for forming the principal cutting edges 8. The part of the swarf chambers 4 not adjoining the principal cutting edges 8 is unground at the drill tip 7.

As evident from FIG. 3 and particularly clearly from FIGS. 6 and 7, the swarf chambers 4 in the region of the drill tip 7 are ground to an extent 9 as seen parallel to the longitudinal axis 3. The length of this extent 9 is preferably between half and twice the diameter of the tool bit 1. In particular, the length of the extent 9 can lie between 0.8 times and 1.2 times the diameter of the tool bit 1.

As additionally apparent from FIGS. 3 to 7, additional cutting edges 10 (auxiliary cutters 10) are formed in the tool bit 1 and similarly adjoin the swarf chambers 4. The forming of the additional cutting edges 10 is also carried out—as also in the prior art—in the already sintered tool bit 1. However, by contrast to the state of the art in the case of the additional cutting edges 10 the swarf chamber region 4 is similarly unground in part. In particular, according to FIGS. 3 to 7 grinding of the swarf chambers 4 is carried out only in the immediate vicinity of the additional cutting edges 10. The remaining region of the swarf chambers 4 remains unground. Other than in the vicinity of the drill tip 7 (abbreviation: extent 9) the swarf chambers 4 are therefore ground exclusively in the region of the additional cutting edges 10.

Figure 4:
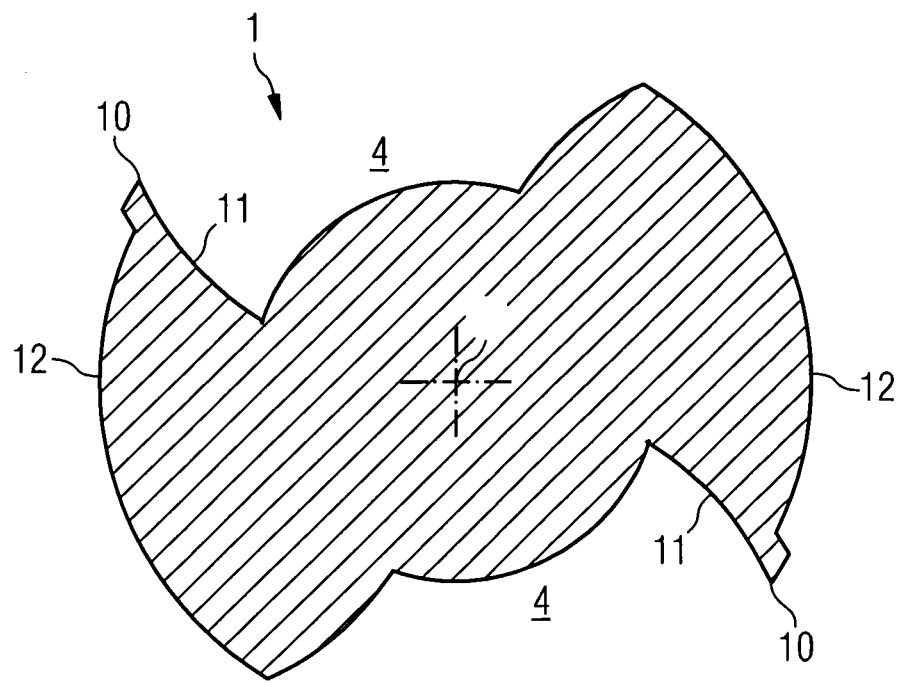
Figure 5:
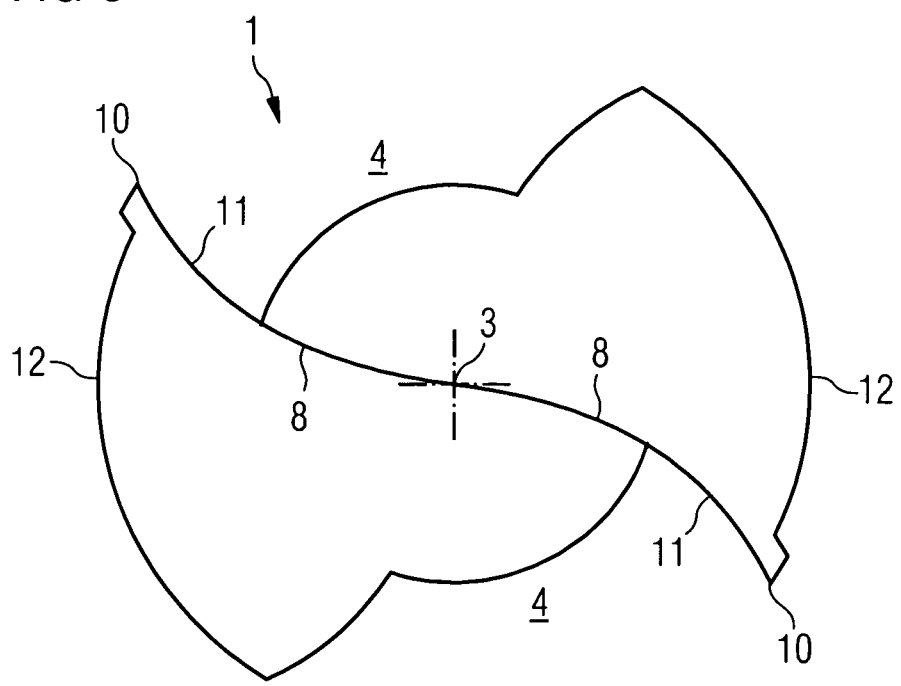

As evident particularly clearly from FIG. 4, the additional cutting edges 10 are each bounded by two boundary surfaces 11, 12. In this connection the boundary surfaces 11 at the same time bound the swarf chambers 4. The boundary surfaces 12 do not bound the swarf chambers 4. The boundary surfaces 12 can alternatively be ground or at least partly unground. In particular, it is possible prior to sintering to carry out material removal at the blank in the region of the boundary surfaces 12 so that the tool bit 1 after sintering has in the region of the boundary surfaces 12 a diameter which is smaller than a nominal diameter which the additional cutting edges 10 have from the longitudinal axis 3. In this case, the boundary surfaces 12 have to be ground only in the region of the additional cutting edges 10 (and in the region of the drill tip 7). The diameter in the region of the boundary surfaces 12 can lie, for example, between 0.9 times and 0.95 times the nominal diameter.

The present invention is not restricted to tool bits 1 constructed as drills. Alternatively, the tool bit 1 can be constructed as, for example, a milling head. This is briefly explained in the following in connection with FIGS. 8, 9 and 10.

According to FIG. 8 the milling head 1 similarly comprises the shank 6 and the swarf chamber region 5. Swarf chambers 4 are formed in the tool bit 1 in the swarf chamber region 5. The principal cutting edges 8 again bound the swarf chambers 4, but just like the swarf chambers 4 run, for example, helically around the longitudinal axis 3. The swarf chambers 4 are—analogously to the construction of the tool bit 1 as a drill—only partly ground and otherwise unground.

If the milling head 1 in correspondence with FIG. 8 has a substantially cylindrical profile, an end face 13 of the milling head 1 usually has to be similarly ground. Alternatively, however, according to FIGS. 9 and 10 it is conceivable that the milling head 1 is inwardly curved at its end faces 13. In this case it is possible to grind the end faces 13 similarly only in the region of the principal cutting edges 8 and otherwise leave them unground.

The above description serves exclusively for explanation of the present invention. The scope of protection of the present invention shall, thereagainst, be determined exclusively by the attached claims.

REFERENCE NUMERAL LIST 1 tool bit
2 workpiece
3 longitudinal axis
4 swarf chambers
5 swarf chamber region 6 shank
7 drill tip
8 principal cutting edges
9 extent
10 additional cutting edges
11, 12 boundary surfaces
13 end faces
S1-S6 steps

The invention claimed is:

1. A production method for a tool bit consisting of sintered material, comprising the following steps performed in the stated sequence:
   a blank having a longitudinal axis is produced from the material to be sintered;
   at least one swarf chamber spaced from the longitudinal axis and extending along the longitudinal axis is formed into the blank;
   the tool bit is produced by sintering the blank; and
   at least one cutting edge adjoining the swarf chamber is formed in the tool bit by grinding and the tool bit is further processed by grinding, wherein, however, the swarf chamber is ground exclusively in a region adjoining at least one of the cutting edges and otherwise remains unground, and wherein at least one of the cutting edges extends at an end face of the tool bit and that the swarf chamber, insofar as it adjoins this cutting edge is ground over a length, as seen in the direction of the longitudinal axis, lying between half and twice the diameter of the tool bit.

2. The production method according to claim 1, wherein the tool hit is formed as a drill and the cutting edge at the end face is arranged at the drill tip.

3. The production method according to claim 1, wherein at least one of the cutting edges extends along the longitudinal axis of the tool hit and the swarf chamber, insofar as it adjoins this cutting edge, is ground only in a region directly adjoining this cutting edge.

4. The production method according to claim 3, wherein the cutting edge extending along the longitudinal axis of the tool bit is bounded by two boundary surfaces, one boundary surface at the same time bounds the swarf chamber and the other boundary surface does not bound the swarf chamber and that the other boundary surface is at least partly unground.

5. A ready-for-use tool bit consisting of sintered material,
   wherein the tool bit has a longitudinal axis and at least one swarf chamber spaced from the longitudinal axis and extending along the longitudinal axis is formed in the tool bit,
   wherein the tool bit has at least one cutting edge adjoining the swarf chamber and formed in the tool bit by grinding the already sintered tool bit,
   the swarf chamber being ground exclusively in a region adjoining at least one of the cutting edges, and otherwise unground, and wherein at least one of the cutting edges extends at an end face of the tool bit and that the swarf chamber, insofar as it adjoins this cutting edge, is ground over a length, as seen in the direction of the longitudinal axis, lying between half and twice the diameter of the tool bit.

6. The tool bit according to claim 5, wherein the tool bit is constructed as a drill and the cutting edge at the end face is arranged at the drill tip.

7. The tool bit according to claim 6, wherein at least one of the cutting edges extends along the longitudinal axis of the tool bit and the swarf chamber, insofar as it adjoins this cutting edge, is ground only in a region directly adjoining this cutting edge.

8. The tool bit according to claim 5, wherein the cutting edge extending along the longitudinal axis of the tool bit is hounded by two boundary surfaces, one boundary surface at the same time bounds the swarf chamber and the other boundary surface does not bound the swarf chamber and the other boundary surface at least in part is unground.

9. The tool bit according to claim 5, wherein the material is metal or a metal-ceramic mixture.

* * * * *